United States Patent
Lessmeister

(10) Patent No.: US 9,592,867 B2
(45) Date of Patent: Mar. 14, 2017

(54) MOTOR VEHICLE BODY STRUCTURE HAVING A BODY REINFORCEMENT ELEMENT AND METHOD FOR PRODUCING A MOTOR VEHICLE BODY STRUCTURE HAVING A BODY REINFORCEMENT ELEMENT

(71) Applicant: GM GLOBAL TECHNOLOGY OPERATIONS LLC, Detroit, MI (US)

(72) Inventor: Roland Lessmeister, Otterberg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 134 days.

(21) Appl. No.: 14/109,274

(22) Filed: Dec. 17, 2013

(65) Prior Publication Data
US 2014/0167448 A1    Jun. 19, 2014

(30) Foreign Application Priority Data
Dec. 17, 2012   (DE) .................. 10 2012 024 631

(51) Int. Cl.
| | | |
|---|---|---|
| *B62D 27/02* | (2006.01) | |
| *B62D 65/02* | (2006.01) | |
| *B62D 25/02* | (2006.01) | |

(52) U.S. Cl.
CPC ......... *B62D 65/024* (2013.01); *B62D 25/025* (2013.01); *Y10T 29/49826* (2015.01); *Y10T 156/10* (2015.01)

(58) Field of Classification Search
CPC . B62D 25/025; B62D 25/2036; B62D 27/023
USPC ............ 296/203.01, 203.03, 203.04, 187.11, 296/187.12, 29, 30, 33
See application file for complete search history.

(56) References Cited

U.S. PATENT DOCUMENTS

| | | | | |
|---|---|---|---|---|
| 4,679,820 A | * | 7/1987 | Srock ..................... | B62D 21/09 280/781 |
| 5,246,263 A | | 9/1993 | Tanaka et al. | |
| 5,641,194 A | * | 6/1997 | Honma et al. ........... | 296/203.03 |
| 6,286,867 B1 | * | 9/2001 | Braemig ................. | B60R 19/00 280/762 |
| 6,364,358 B1 | * | 4/2002 | Miller .................... | B62D 25/04 280/784 |

(Continued)

FOREIGN PATENT DOCUMENTS

| | | |
|---|---|---|
| DE | 19532004 A1 | 3/1996 |
| DE | 19956430 A1 | 5/2001 |

(Continued)

OTHER PUBLICATIONS

German Patent Office, German Patent Search Report for Application No. 102012024631.5 mailed Sep. 16, 2013.

*Primary Examiner* — Hilary Gutman
(74) *Attorney, Agent, or Firm* — Lorenz & Kopf LLP

(57) ABSTRACT

A motor vehicle body structure is provided. The motor vehicle body structure includes an outer side wall, a lateral floor reinforcement for absorbing forces in the event of an impact event, an inner side wall with a lateral sill region and a wheel housing region, which at least partially forms a wheel housing of the vehicle. A body reinforcement element is connected to the wheel housing region of the inner side wall and to the lateral floor reinforcement in a positively joined, non-positively joined and/or materially joined manner.

15 Claims, 4 Drawing Sheets

(56) References Cited

U.S. PATENT DOCUMENTS

| | | | | |
|---|---|---|---|---|
| 7,140,668 B2 * | 11/2006 | Wesch et al. | ............ | 296/187.02 |
| 7,163,259 B2 * | 1/2007 | Hayashi | ................ | B62D 24/02 |
| | | | | 296/187.09 |
| 7,192,071 B2 * | 3/2007 | Watanabe et al. | .............. | 296/30 |
| 8,118,355 B2 * | 2/2012 | Tamura et al. | ............... | 296/209 |
| 8,308,227 B2 * | 11/2012 | Tsuruta et al. | ................ | 296/209 |
| 8,662,575 B2 * | 3/2014 | Tamura | ......................... | 296/209 |
| 2012/0306239 A1 | 12/2012 | Tamura et al. | | |
| 2013/0049391 A1 * | 2/2013 | Kurogi et al. | ................... | 296/30 |
| 2013/0049405 A1 * | 2/2013 | Kurogi et al. | ........... | 296/203.01 |

FOREIGN PATENT DOCUMENTS

| | | |
|---|---|---|
| DE | 10028716 B4 | 6/2001 |
| DE | 10001102 A1 | 7/2001 |
| DE | 102008057352 A1 | 5/2009 |
| DE | 102008056507 A1 | 5/2010 |
| JP | H04293680 A | 10/1992 |
| JP | H0597057 A | 4/1993 |
| JP | 2007131264 A | 5/2007 |
| JP | 2007331430 A | 12/2007 |
| JP | 2008001244 A | 1/2008 |
| KR | 20010060924 A | 7/2001 |

\* cited by examiner

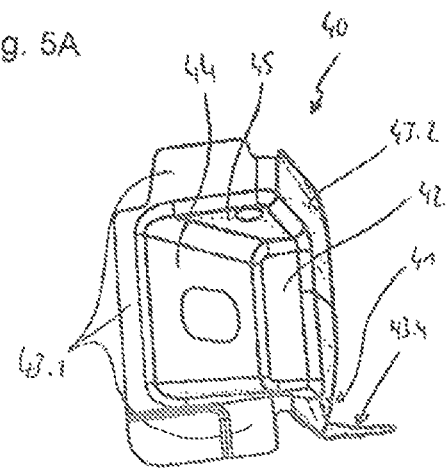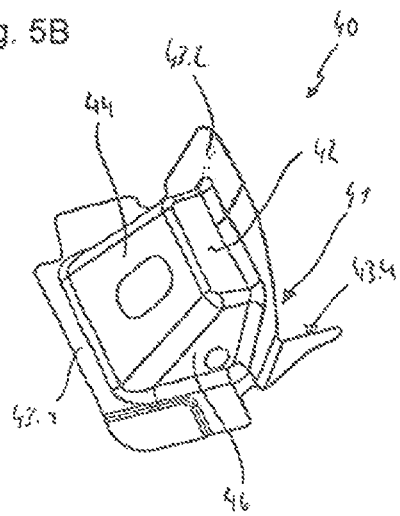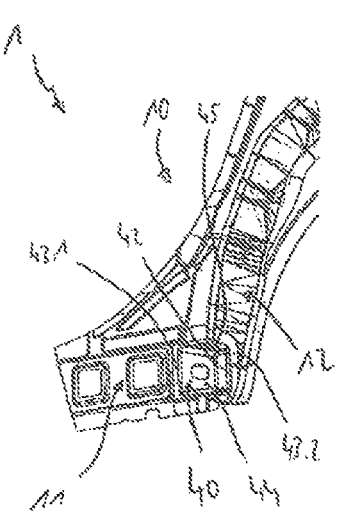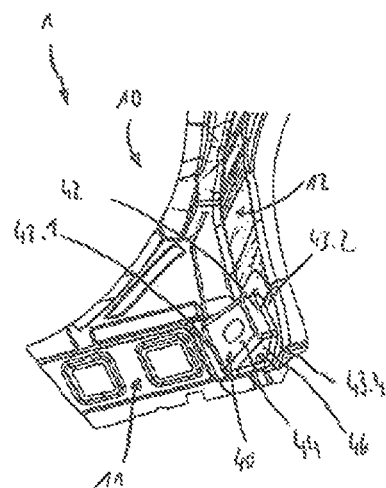

MOTOR VEHICLE BODY STRUCTURE HAVING A BODY REINFORCEMENT ELEMENT AND METHOD FOR PRODUCING A MOTOR VEHICLE BODY STRUCTURE HAVING A BODY REINFORCEMENT ELEMENT

CROSS REFERENCE TO RELATED APPLICATION

This application claims priority to German Patent Application No. 10 2012 024 631.5, filed Dec. 17, 2012, which is incorporated herein by reference in its entirety.

TECHNICAL FIELD

The technical field relates to a motor vehicle body structure, a motor vehicle with such a motor vehicle body structure and a method for producing a motor vehicle body structure.

BACKGROUND

Motor vehicle body structures known in-house, which are arranged in the region of a lateral sill and of a wheel housing of a motor vehicle, comprise an inner side wall and an outer side wall of the motor vehicle, wherein between these side walls a lateral floor reinforcement is arranged.

In an impact event, such a motor vehicle body structure can absorb and/or distribute for further dissipation in the vehicle energy resulting from introduced lateral and/or longitudinal forces.

Among other things because of production-related restrictions, motor vehicle body structures of the type described above require a termination plate to be mounted separately for delimiting the motor vehicle body structure with respect to a wheel housing of the motor vehicle, in particular with respect to fluid and/or dirt ingress. Up to now, this termination plate is being exclusively fastened to the side walls of the lateral sill.

In addition, other objects, desirable features and characteristics will become apparent from the subsequent summary and detailed description, and the appended claims, taken in conjunction with the accompanying drawings and this background.

SUMMARY

One of various aspects of present disclosure is to make available an improved motor vehicle body structure.

According to an exemplary aspect of the present disclosure, a motor vehicle body structure comprises an outer side wall, a lateral for reinforcement for absorbing forces in the event of an impact event and an inner side wall with a lateral sill region and with a wheel housing region, which at least partially forms a wheel housing of the vehicle. Here, a body reinforcement element is connected to the wheel housing region of the inner side wall and to the lateral floor reinforcement in a positively joined, non-positively joined and/or materially joined manner.

Positively joined components lock together due to the way they are shaped, i.e. a projection in one engages with a recess in the other, thereby preventing relative motion of the components. Non-positively joined components are held together by friction. Materially joined components are joined through an additional step such as welding, gluing, or riveting.

Because of this, a better stability, a higher stiffness and/or a higher operational strength of the motor vehicle body structure can be advantageous achieved in an embodiment.

Additionally or alternatively, a twisting of the inner side wall, of the outer side wall and/or of the lateral floor reinforcement can be better counteracted in an embodiment, in particular during the normal driving operation of the motor vehicle.

Additionally or alternatively, energy, in an embodiment, which results from introduced lateral and/or longitudinal forces, during an impact event, for example, can be advantageously better absorbed and/or better distributed for further dissipation in the vehicle.

In terms of the various teachings of the present disclosure, a body reinforcement element can comprise a single component, in particular a shaped steel sheet part, or comprise a plurality of components, in particular shaped steel sheet parts which are connected to one another in a fixed manner.

Independently of whether the body reinforcement element comprises one or a plurality of components, inner side wall, outer side wall and/or lateral floor reinforcement can each comprise one or a plurality of components which are connected among one another in a fixed manner.

In an exemplary embodiment, the body reinforcement element is connected to the wheel housing region of the inner side wall by at least one, in one example, a plurality of welded connections, in one example, spot welded connections.

A lateral sill region is to mean in particular a region of the inner side wall, which substantially extends in vehicle longitudinal direction and in vehicle vertical direction.

A wheel housing region is to mean in particular a region of the inner side wall, which substantially extends in vehicle transverse direction and vehicle vertical direction.

The lateral sill region and the wheel housing region jointly form an angle in an embodiment, which amounts to more than about 45°, in one example, is between about 75° and about 105°.

In one example, in order to advantageously make possible an improved distribution of forces from driving situations and/or impact events in the motor vehicle body structure, the body reinforcement element according to an embodiment of the present disclosure is connected to the lateral sill region of the inner side wall in a positively joined, non-positively joined and/or materially joined manner wherein the lateral sill region of the inner side wall extends at least substantially in vehicle longitudinal direction.

The body reinforcement element can be connected to the lateral sill region of the inner side wall in one example, through at least one, in one example, a plurality of welded connections, for example, spot welded connections. Additionally or alternatively, lateral sill region and body reinforcement element can be glued, caulked, welded, riveted or the like to one another.

In one example, in order to advantageously make possible an improved distribution of forces from driving situations and/or impact events in the motor vehicle body structure, the body reinforcement element in an embodiment of the present disclosure is connected to the outer side wall in a positively joined, non-positively joined and/or materially joined manner.

The body reinforcement element can be connected to the outer side wall through at least one, in one example, a plurality of welded connections, for example, spot welded connections.

Additionally or alternatively, outer side wall and body reinforcement element can be glued, caulked, welded, riveted or the like to one another.

In order to achieve a durable operational strength of the motor vehicle structure, the body reinforcement element closes the wheel housing according to an embodiment of the present disclosure.

In an embodiment, the motor vehicle body structure is sealed through the body reinforcement element against fluid and/or dirt ingress from the wheel housing.

"Sealing" in particular against fluid and/or dirt ingress from the wheel housing is to mean in particular that during arbitrary driving operation states of the vehicle fluids introduced into the wheel housing region, such as water, watery saline solutions, water-oil and/or water-fuel emulsions, and/ or dirt particles, such as tyre abrasion, stones, gravel, spreading material and/or leaves are kept away from the interior of the motor vehicle body structure through the body reinforcement element.

In an embodiment, the motor vehicle body structure can be delimited by the body reinforcement element with respect to the space taken up by the wheel housing.

Here, "delimiting" is to mean in particular that the space taken up by the motor vehicle body structure is delimited with respect to the space taken up by the wheel housing, positively sealed and/or hermetically sealed.

In order to be able to advantageously combine a low weight of the motor vehicle body structure with a higher torsional stiffness, the body reinforcement element according to an embodiment of the present disclosure and the inner side wall are formed of different, in one example, metallic materials in each case.

Body reinforcement element and inner side wall can be formed of different steel sheet alloys.

Alternatively, the body reinforcement can be formed of a steel sheet alloy and the inner side wall of an aluminium sheet alloy. Alternatively, body reinforcement element and inner side wall can be formed of other, different materials.

According to an embodiment of the present disclosure, the body reinforcement means comprises at least one connection surface, which substantially lies flat against a connection surface of the lateral floor reinforcement.

Because of this, a simpler and/or less error-prone assembly of the connection, in particular glued connection and/or welded connection, can be advantageously achieved between the body reinforcement means and the lateral floor reinforcement.

Because of this, better stability, higher stiffness and/or higher operational strength of the motor vehicle body structure in particular can be advantageously achieved.

The body reinforcement element and the lateral floor reinforcement in an embodiment can be fixed to one another by means of a glued connection of these two connection surfaces.

In one example, the connection surface of the body reinforcement element and the connection surface of the lateral floor reinforcement that can be flatly placed against said body reinforcement element are located horizontally to an assembly direction of the lateral floor reinforcement, wherein the lateral floor reinforcement in this assembly direction can be introduced with the inner side wall and/or with the body reinforcement element.

A glued connection in this case is to mean in particular a connection, through which at least two connecting partners are connected in a fixed manner by means of adhesion between an adhesive and the one connection partner or the other connection partner.

In order to ensure a simpler and/or more cost-effective assembly of the motor vehicle body structure, the lateral floor reinforcement according to an embodiment of the present disclosure is substantially formed with an angle profile, in particular with at least one U-, I-, T- and/or Z-profile. Here, at least one, in one example, at least two or all legs of the angle profile each contact a connection surface of the body reinforcement element in an end region of the lateral floor reinforcement near a wheel housing, so that in particular horizontal forces and/or shearing forces can be transmitted to the respective contact surface.

In order to make possible a better distribution of forces which occur during the driving operation and/or in an impact event in the motor vehicle structure, the body reinforcement element has a sloping surface according to an embodiment of the present disclosure, which forms an angle between about 0° and about 90°, in one example, between about 30° and about 60° with a welding connection surface of the body reinforcement element.

In particular, a sloping surface is provided, which forms such an angle both with a connection surface of the body reinforcement element on the lateral sill side as well as with a connection surface of the body reinforcement element on the wheel housing side.

According to an aspect of the present disclosure, a motor vehicle comprises a motor vehicle structure according to any one of the various embodiments of the present disclosure described above.

According to an aspect of the present disclosure, a method for producing a motor vehicle body structure is provided. In one example, the method comprises: the body reinforcement element is connected to the wheel housing region of the inner side wall and, in particular subsequently, simultaneously or beforehand, the lateral floor reinforcement is connected to the body reinforcement element.

Because of this, the locking or the placement process during the assembly can in particular advantageously be rendered more securely and/or more accessibly.

In one example, in order to advantageously make possible an improved distribution of forces from driving situations and/or impact events in the motor vehicle body structure, the body reinforcement element according to an embodiment of the present disclosure is in particular subsequently, simultaneously with or before the connecting of the body reinforcement element to the wheel housing region and/or the connecting of the lateral floor reinforcement to the body reinforcement element, connected to the lateral sill region of the inner side wall.

In one example, in order to advantageously make possible an improved distribution of forces, from driving situations and/or impact events, in the motor vehicle body structure, the body reinforcement element according to an embodiment of the present disclosure is connected in particular subsequent to, simultaneously with or before the connecting of the body reinforcement element to the wheel housing region and/or the connecting of the lateral floor reinforcement to the body reinforcement element, connected to the outer side wall.

In an embodiment of the method, the body reinforcement element is connected to the lateral sill region and the wheel housing region of the inner side wall by means of a welding method.

Because of this, a better stability, a higher stiffness and/or a higher operational strength of the motor vehicle body structure can be advantageously achieved in an embodiment.

In an embodiment of the method, the lateral floor reinforcement and the body reinforcement element are connected to one another by means of a glued connection.

Because of this, a better stability, a higher stiffness and/or a higher operational strength of the motor vehicle body structure can in particular be advantageously achieved.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIGS. 5A-5B illustrate a body reinforcement element according to an exemplary embodiment of the present disclosure, in different perspective representations;

FIGS. 6A-6B illustrate a motor vehicle body structure with a body reinforcement element according to FIGS. 5A-5B, in different perspective representations.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
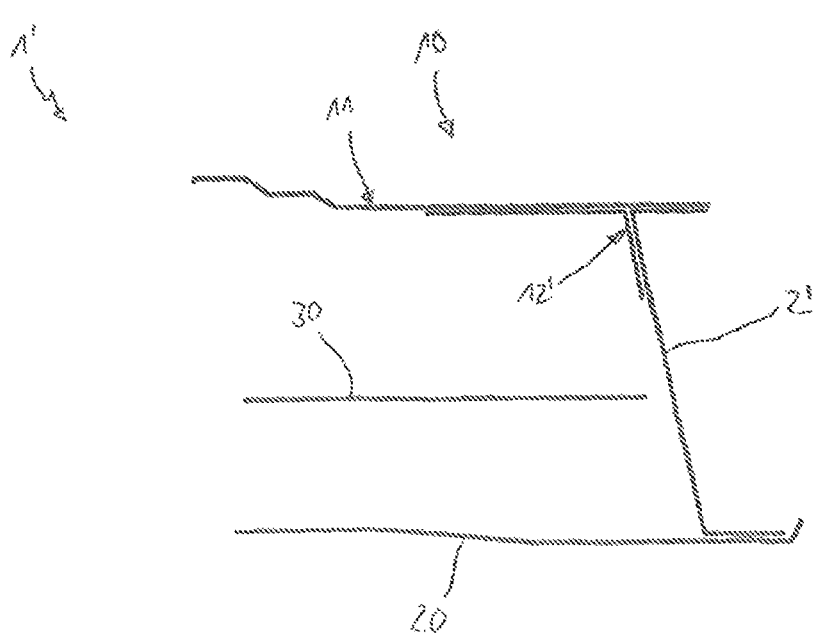
FIG. 1 is a lateral sill termination according to in-house practice up to now in a sectional representation.
Figure 2:
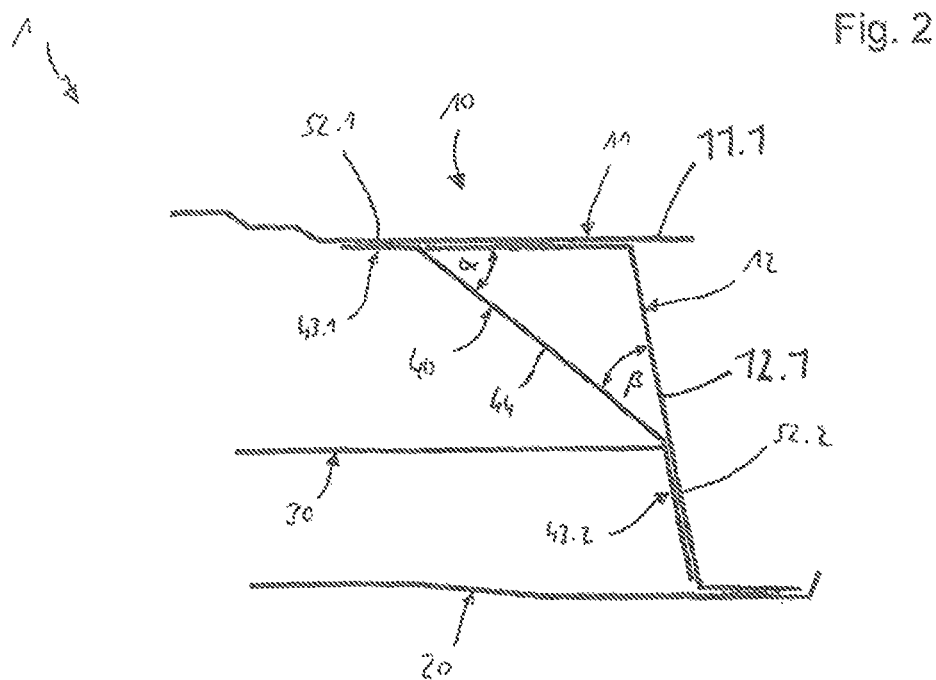
FIG. 2 is a motor vehicle body structure with a body reinforcement element according to an exemplary embodiment of the present disclosure in a sectional representation.
Figure 3:
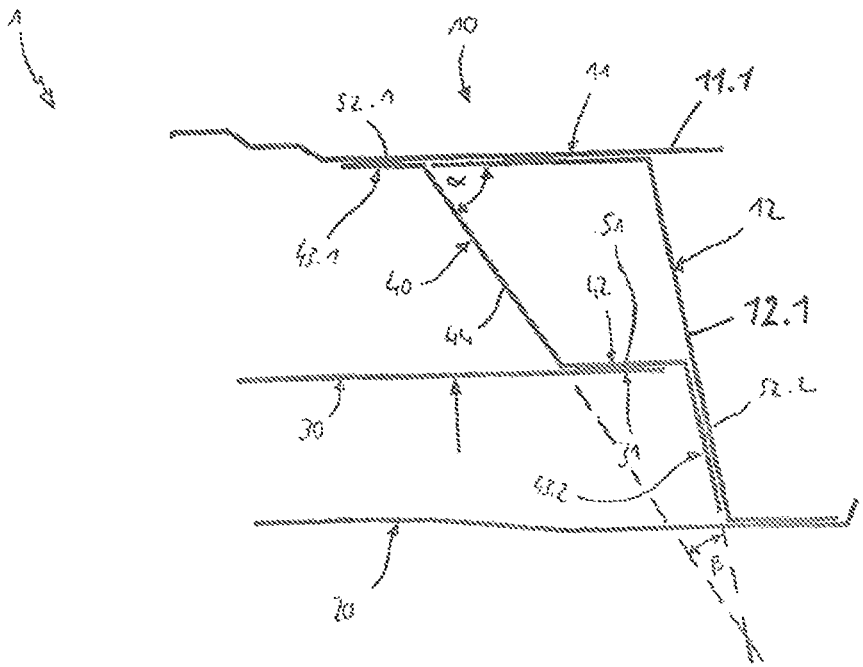
FIG. 3 is a motor vehicle body structure with a body reinforcement element with a gluing connection surface according to an exemplary embodiment of the present disclosure in a sectional representation.
Figure 4:
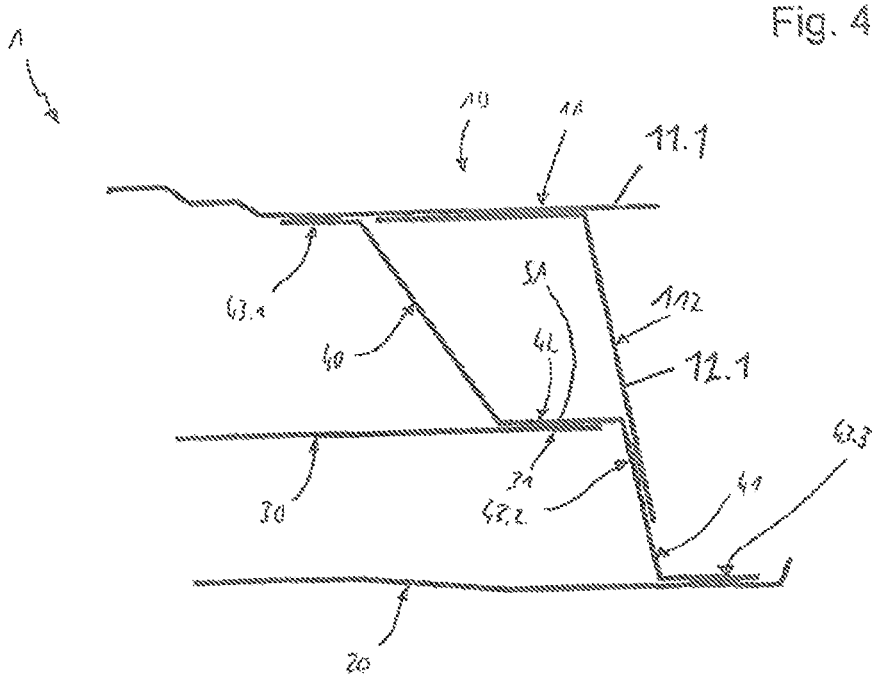
FIG. 4 is a motor vehicle body structure with a partly closed inner side wall according to an exemplary embodiment of the present disclosure in a sectional representation.
Figure 7A:
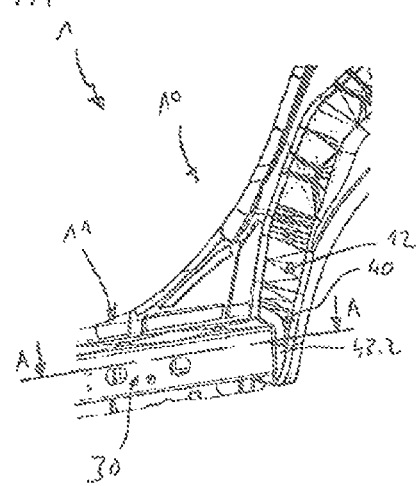
FIGS. 7A-7B illustrate a motor vehicle body structure with a body reinforcement element according to FIGS. 5A-5B and with a lateral floor reinforcement, in different perspective representations.
Figure 7B:
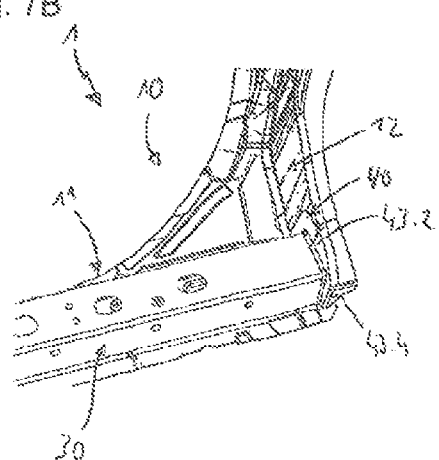

The sectional representations of the FIGS. 2-4 each show a section in a position A-A according to FIGS. 7A-7B, wherein this information is to serve only for better understanding but not make possible any conclusions regarding a configuration of the embodiment shown in the FIGS. 2-4, in particular not with respect to a configuration of the embodiments described in FIG. 2-4 according to the embodiment shown in FIGS. 7A-7B. Also with respect to FIG. 1, the section A-A entered in FIGS. 7A-7B merely provides basic information for understanding the sectional representation.

FIG. 1 shows a lateral sill termination 1' according to the prior art in a sectional representation, wherein the lateral sill termination 1' comprises an inner side wall 10 with a lateral sill region 11, an outer side wall 20 and a lateral floor reinforcement 30 arranged in between. An open wheel housing region 12' arranged on the lateral sill region 11 is only rudimentarily and in particular not formed completely as far as to the outer vehicle end of the lateral floor reinforcement 30 or not completely as far as to the outer side wall 20 in the region of the section. For terminating the lateral sill termination 1' against the vehicle exterior in the region of the wheel housing, a closing plate 2' is arranged on the lateral sill region 11, on the open wheel housing region 12' and on the outer side wall 20.

FIG. 2 shows a motor vehicle body structure with a body reinforcement element 40 according to an embodiment of the present disclosure in a sectional representation. The motor vehicle body structure 1 comprises an inner side wall 10 with a lateral sill region 11, an outer side wall 20 as well as a lateral floor reinforcement 30.

The closed wheel housing region 12 of the inner side wall 10 is welded to its lateral sill region 11 and to the outer side wall 20, for example through spot welds. Because of this, the wheel housing of the motor vehicle is closed and thus the motor vehicle body structure 1 also sealed or delimited with respect to the vehicle exterior.

A body reinforcement element 40 is welded to an inner side wall plane 11.1 defined by the inner side wall 10 both on the welding connection surface 43.1 of the lateral sill region 11 as well as to the welding connection surface 43.2 to a wheel housing plane 12.1 defined by the wheel housing region 12, for example by means of spot welds 52.1 and 52.2.

The body reinforcement element 40 is also connected to the lateral floor reinforcement 30. This connection is effected in the present embodiment by means of flat contact surfaces of the body reinforcement element 40, which extend above and below the drawing plane parallel to the drawing plane of FIG. 2, and which are contacted by corresponding contact surfaces of the lateral floor reinforcement formed as a U-profile. These contact surfaces are shown in FIGS. 5A-5B as upper contact surface 45 and as lower contact surface 46 with respect to the embodiment shown there.

The lateral floor reinforcement 30 is additionally connected to the lateral sill region 11 in a fixed manner (not shown in the FIGS. 2-4).

The body reinforcement element 40 has a sloping surface 44, which with the welding connection surface 43.1 forms the angle α and with the welding connection surface 43.2 the angle β.

Because of this, forces acting on the motor vehicle body structure 1 can be more effectively deflected, so that an increase of the stiffness and/or an improvement of the energy dissipation of the motor vehicle body structure 1 are/is made possible.

FIG. 3 shows a motor vehicle body structure 1 with a body reinforcement element 40 with a gluing connection surface 42 according to an exemplary embodiment of the present disclosure in a sectional representation, wherein this gluing connection surface 42 is correspondingly formed to a corresponding connection surface 31 of the lateral floor reinforcement 30.

Between the gluing connection surface 42 and the connection surface 31, an adhesive is applied, by means of which the body reinforcement element 40 and the lateral floor reinforcement 30 can be connected to one another in a fixed manner. Thus, an increased torsional stiffness of the motor vehicle body structure 1 can be achieved.

The glued connection 51 between the body reinforcement element 40 and the lateral floor reinforcement element 30 according to the embodiment described here makes possible advantages with respect to a simpler and more process-secure assembly, since the lateral floor reinforcement 30 formed as a U-profile can be pushed onto the body reinforcement element 40 in the direction of the unmarked arrow in FIG. 3. During the assembly, the adhesive arranged on the gluing connection surface 42 is distributed or not wiped off with a view to an optimal glued connection.

FIG. 4 shows a motor vehicle body structure 1 with an inner side wall 10 with a partly closed wheel housing region 112 according to an embodiment of the present disclosure in a sectional representation. Other than in the embodiment described in FIG. 3, the wheel housing region 112 in this embodiment, at least in the position shown in FIG. 4, is not formed contacting the outer side wall 20 with respect to a vehicle vertical direction.

The partly closed wheel housing region 112 is welded to the body reinforcement element 40 on the welding connection surface 43.2. The wheel housing is closed in that the body reinforcement element 40 on its welding connection surface 43.3 is welded to the outer side wall 20.

Such a configuration can be practical in particular when because of assembly-related and/or production-related restrictions, direct welding of the wheel housing region 112 of the inner side wall 10 to the outer side wall 20 is not possible.

FIGS. 5A-5B show a body reinforcement element 40 according to an embodiment of the present disclosure in different perspective representations. The body reinforcement element 40 comprises an upper contact surface 45 shown in FIG. 5A for the flat contacting of an upper leg and a lower contact surface 46 shown in FIG. 5B for the flat contacting of a lower leg of the lateral floor reinforcement formed as a U-profile.

The welding connection surface 43.4 makes possible an introduction of spot welds, which with respect to the welding connection surface 43.2 is offset by an in one example, right angle, and thus an improved stiffness of the motor vehicle body structure 1.

FIGS. 6A-6B show a motor vehicle body structure 1 with a body reinforcement element 40 according to FIGS. 5A-5B, in different perspective representations. The body reinforcement element 40 is welded to the lateral sill region 11 of the inner side wall 10 on the welding connection surface 43.1. The body reinforcement element 40 is additionally welded to the wheel housing region 12 of the inner side wall on the welding connection surfaces 43.2 and/or 43.4.

FIGS. 7A-7B show a motor vehicle body structure 1 with a body reinforcement element 40 according to FIGS. 5A-5B and with a lateral floor reinforcement 30, in different perspective representations. The lateral floor reinforcement 30 formed as a U-profile contacts the contact surfaces 45 and 46 concealed in FIGS. 7A-7B and with its connection surface 31 forms a glued connection with the gluing connection surface 42 of the body reinforcement element 40, wherein between the connection surfaces 31 and 42 adhesive is arranged.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A motor vehicle body structure, comprising:
an outer side wall,
a lateral floor reinforcement for absorbing forces, and
an inner side wall with a lateral sill region and a wheel housing region, which at least partially forms a wheel housing of the vehicle,
wherein a body reinforcement element extends angularly between a wheel housing plane and an inner side wall plane and is connected to the wheel housing region of the inner side wall and to the lateral floor reinforcement in at least one of a positively joined, a non-positively joined and a materially joined manner.

2. The motor vehicle body structure according to claim 1, wherein the body reinforcement element is connected to the lateral sill region of the inner side wall in at least one of a positively joined, a non-positively joined and a materially joined manner, which at least substantially extends in vehicle longitudinal direction.

3. The motor vehicle body structure according to claim 1, wherein the body reinforcement element is connected to the outer side wall in at least one of a positively joined, a non-positively joined and a materially joined manner.

4. The motor vehicle body structure according to claim 1, wherein the body reinforcement element closes the wheel housing.

5. The motor vehicle body structure according to claim 1, wherein the body reinforcement element and the inner side wall are formed of different materials.

6. The motor vehicle body structure according to claim 5, wherein the body reinforcement element and the inner side wall are formed of different metallic materials.

7. The motor vehicle body structure according to claim 1, wherein the body reinforcement element comprises at least one connection surface, which substantially flatly contacts a connection surface of the lateral floor reinforcement.

8. The motor vehicle body structure according to claim 1, wherein the lateral floor reinforcement is substantially formed with an angle profile, and wherein at least one leg of the angle profile in an end region of the lateral floor reinforcement near the wheel housing contacts a second connection surface of the body reinforcement element.

9. The motor vehicle body structure according to claim 1, wherein the body reinforcement element comprises a sloping surface, which with a welding connection surface of the body reinforcement element forms an angle ($\alpha$, $\beta$) which is greater than 0° and smaller than 90°.

10. The motor vehicle body structure according to claim 1, wherein the body reinforcement element comprises a sloping surface, which with a welding connection surface of the body reinforcement element forms an angle ($\alpha$, $\beta$) which is greater than 30° and smaller than 60°.

11. A motor vehicle, comprising:
a motor vehicle body structure including an outer side wall, a lateral floor reinforcement for absorbing forces, an inner side wall with a lateral sill region and a wheel housing region, which at least partially forms a wheel housing of the vehicle,
wherein a body reinforcement element extends angularly between a wheel housing plane and an inner side wall plane and is connected to the wheel housing region of the inner side wall and to the lateral floor reinforcement in at least one of a positively joined, a non-positively joined and a materially joined manner and the body reinforcement element closes the wheel housing.

12. The motor vehicle according to claim 11, wherein the body reinforcement element is connected to the lateral sill region of the inner side wall in at least one of a positively joined, a non-positively joined and a materially joined manner, which at least substantially extends in vehicle longitudinal direction.

13. The motor vehicle according to claim 11, wherein the body reinforcement element is connected to the outer side wall in at least one of a positively joined, a non-positively joined and a materially joined manner.

14. The motor vehicle according to claim 11, wherein the body reinforcement element and the inner side wall are formed of different materials.

15. The motor vehicle according to claim 11, wherein the body reinforcement element comprises at least one connection surface, which substantially flatly contacts a connection surface of the lateral floor reinforcement.

* * * * *